(12) United States Patent
Åberg

(10) Patent No.: US 7,444,449 B2
(45) Date of Patent: Oct. 28, 2008

(54) METHOD, COMPUTER PROGRAM PRODUCT AND COMPUTER SYSTEM FOR CONTROLLING EXECUTION OF AN INTERRUPTION ROUTINE

(75) Inventor: Kristoffer Åberg, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 190 days.

(21) Appl. No.: 11/350,274

(22) Filed: Feb. 9, 2006

(65) Prior Publication Data
US 2007/0186024 A1 Aug. 9, 2007

(51) Int. Cl.
*G06F 13/24* (2006.01)
(52) U.S. Cl. ............... 710/260; 710/269
(58) Field of Classification Search .......... 710/15, 710/18, 47–50, 261–266, 269
See application file for complete search history.

(56) References Cited

U.S. PATENT DOCUMENTS

| | | | | |
|---|---|---|---|---|
| 4,456,970 A * | 6/1984 | Catiller et al. | ................. | 710/48 |
| 5,363,506 A * | 11/1994 | Fukuoka | ................... | 710/267 |
| 5,542,076 A * | 7/1996 | Benson et al. | ............... | 710/260 |
| 5,708,817 A * | 1/1998 | Ng et al. | ...................... | 710/266 |
| 5,717,932 A * | 2/1998 | Szczepanek et al. | ........ | 710/260 |
| 6,085,215 A * | 7/2000 | Ramakrishnan et al. | ...... | 718/102 |
| 6,330,583 B1 * | 12/2001 | Reiffin | ........................ | 718/105 |
| 6,477,600 B1 * | 11/2002 | Baxter et al. | ................. | 710/260 |
| 6,629,252 B1 * | 9/2003 | Gholami et al. | ............. | 713/401 |
| 6,633,942 B1 * | 10/2003 | Balasubramanian | ........ | 710/264 |
| 6,792,492 B1 * | 9/2004 | Griffin | ......................... | 710/262 |
| 2006/0212757 A1 * | 9/2006 | Ross et al. | ..................... | 714/34 |

OTHER PUBLICATIONS

Deferred Interrupt Processing, Ralph Moore, Micro Digital, 2005.*
XP-002444158, "Concurrent Cooperating Processes, Coroutines and Interrupts", Chapter 15, pp. 506-513.

* cited by examiner

*Primary Examiner*—Khanh Dang
(74) *Attorney, Agent, or Firm*—Harrity & Harrity, LLP (57) ABSTRACT

A method, a computer program product and a computer system for controlling the execution of an interruption routine for interrupting an active application. The computer system may include a first detector unit operable to detect if any application of multiple other applications is requesting interruption of the active application. Furthermore, the computer system may include a second detector unit operable to detect input data generated in response to a user interacting with the computer system. The computer system may also include a processing unit operable to execute a first sub-routine of the interruption routine when the input data has not been detected and a second sub-routine of the interruption routine when the input data has been detected. The execution of any interruption routine may be controlled in dependence of whether it is detected that input data has been generated in response to a user interacting with the computer system.

12 Claims, 5 Drawing Sheets

METHOD, COMPUTER PROGRAM PRODUCT AND COMPUTER SYSTEM FOR CONTROLLING EXECUTION OF AN INTERRUPTION ROUTINE

TECHNICAL FIELD OF THE INVENTION

The present invention relates to a method, a computer program product and a computer system for controlling the execution of an interruption routine.

DESCRIPTION OF RELATED ART

A computer system, such as, e.g., a personal computer or a mobile telephone, is in general capable of conducting various tasks by executing or running several applications substantially at the same time or in parallel. An application may, e.g., be a computer program or an end-user computer program. The ability to execute or run several substantially concurrent applications is in general referred to as "application multitasking". In application multitasking, several applications may be executed substantially at the same time or in parallel, with one or more of the applications being accessible for interaction by the user via a user interface of the computer system. Other applications, however, may not be accessible for interaction by the user. For instance, some applications may run as a background process.

The user of the computer system having multitasking capabilities may interact with one or more applications at the same time via the user interface of the computer system. A first application, which the user has most recently interacted with via the user interface, is an active application. For example, an active application may be an application with which the user is currently interacting via the user interface. As one illustrative example, the first application may be a word processing application. Sometimes, a second application may need the user's attention. For instance, while a document is being composed by the user in the word processing application, the word processing application is active. Nevertheless, the second application, e.g., a calendar application, may need the user's attention by alerting the user of an impending meeting appointment. The second application therefore typically attempts to gain the attention from the user. This may, e.g., be accomplished by requesting interruption of the active application. When the interruption has been requested, an interruption routine will typically be executed for interrupting the active application. The interruption routine may, e.g., comprise displaying a dialog box at the display of the computer system on top of the active application. The user will then typically have to dismiss the dialog box of the second application by means of the user interface of the computer system, for example, by clicking on it with a mouse on a button of the dialog box, or by pressing an escape key on a keyboard of the computer system. The user may also switch focus back to the active application, e.g., by clicking on it with the mouse or pressing certain key combinations, thereby moving the dialog box to the background of the display or minimizing its size on the display.

Sometimes, the aforementioned dialog box of the second application may be welcomed. For example, when the user leaves his computer system for a period of time he may, e.g., want to learn of events that have occurred in the meantime. However, the aforementioned dialog box of the second application may alternatively be annoying or distracting for the user. For example, the aforementioned dialog box may unnecessarily switch the user's attention from the active application to the second application while the user is actively interacting with the active application. Thus, the second application may unnecessarily interrupt the user's current interaction with the active application.

Accordingly, interruption routines for interrupting an active application may bring about unwanted interruptions of a user's current interaction with the active application of the computer system. Furthermore, with an increased amount of application multitasking it is expected that the number of interruptions will increase with the increased number of applications being run in parallel. Therefore, there is, inter alia, a need for a method and a computer system that is capable of coping with an increased amount of interruptions.

SUMMARY OF THE INVENTION

According to some embodiments of the invention, a method performed by a computer system for controlling the execution of an interruption routine for interrupting an active application comprises: detecting if any application of a plurality of other applications is requesting interruption of the active application, if so, detecting input data generated in response to a user interacting with the computer system, and executing a first sub-routine of the interruption routine when the input data has not been detected, and executing a second sub-routine of the interruption routine when the input data has been detected.

According to an embodiment of the invention, the step of executing the first sub-routine of the interruption routine comprises initiating the execution of the interruption routine.

According to an embodiment of the invention, the step of executing the second sub-routine comprises: storing a start address of the interruption routine in an internal storage device of the computer system, scheduling a point in time when the interruption routine is to be executed, and initiating the execution of the interruption routine at the scheduled point in time.

According to an embodiment of the invention, the step of scheduling comprises determining that the point in time when the execution of the interruption routine is to be initiated is when input data generated in response to a user interacting with the computer system has not been detected for a predetermined time.

According to an embodiment of the invention, the step of executing the first sub-routine comprises displaying a first message on a display of the computer system, and the step of executing the second sub-routine comprises displaying a second message on the display of the computer system.

According to an embodiment of the invention, the step of detecting input data generated in response to a user interacting with the computer system further comprises calculating the time period elapsed from the last detected input data. The step of executing the first sub-routine may be performed when the calculated time period is equal to or above a predetermined threshold value, and the step of executing the second sub-routine may be performed when the calculated time period is below a predetermined threshold value.

According to an embodiment of the invention, the step of detecting input data generated in response to a user interacting with the computer system comprises detecting the power consumption of the computer system. The step of executing the first sub-routine may be performed when the detected power consumption is equal to or below the predetermined threshold value, and the step of executing the second sub-routine may be performed when the detected power consumption is above a predetermined threshold value.

According to an embodiment of the invention, a computer program product comprises program instructions for causing a computer system to perform the method according to the embodiments of the invention when said program instructions are run on a computer system.

According to an embodiment of the invention, the computer program product is embodied on a record medium, stored in a computer memory, embodied in a read-only memory, or carried on an electrical carrier signal.

According to some embodiments of the invention, a computer system for controlling the execution of an interruption routine for interrupting an active application comprises: a first detector unit operable to detect if any application of a plurality of other applications is requesting interruption of the active application, a second detector unit operable to detect input data generated in response to a user interacting with the computer system, and a processing unit operable to execute a first sub-routine of the interruption routine when the input data has not been detected and a second sub-routine of the interruption routine when the input data has been detected.

According to an embodiment of the invention, the first detector unit is a monitoring unit comprised in the processing unit. For example, the monitoring unit may be a program controller.

According to an embodiment of the invention, the processing unit provides the second detector unit.

According to an embodiment of the invention, the second detector unit is a sensor.

According to an embodiment of the invention, the processing unit is operable to execute the first sub-routine of the interruption routine by initiating the execution of the interruption routine.

According to an embodiment of the invention, the processing unit is operable to execute the second sub-routine of the interruption routine by storing a start address of the interruption routine in an internal storage device of the computer system, scheduling a point in time when the interruption routine is to be executed, and initiating the execution of the interruption routine at the scheduled point in time.

According to an embodiment of the invention, the processing unit is operable to determine that the point in time when the execution of the interruption routine is to be initiated is when input data generated in response to a user interacting with the computer system has not been detected for a predetermined time.

According to an embodiment of the invention, the processing unit is operable to execute the first sub-routine of the interruption routine by displaying a first message on a display of the computer system, and the processing unit is operable to execute the second sub-routine of the interruption routine by displaying a second message on the display of the computer system.

According to an embodiment of the invention, the second detector unit is further operable to calculate the time period elapsed from the last detected input data. Furthermore, the processing unit may be operable to execute the first sub-routine of the interruption routine when the calculated time period is equal to or above a predetermined threshold value and execute the second sub-routine of the interruption routine when the calculated time period is below a predetermined threshold value.

According to an embodiment of the invention, the second detector unit is operable to detect input data by detecting the power consumption of the computer system. Furthermore, the processing unit may be operable to execute the first sub-routine when the detected power consumption is equal to or below the predetermined threshold value and execute the second sub-routine when the detected power consumption is above a predetermined threshold value.

Further embodiments of the invention are defined in the dependent claims.

Some embodiments of the invention provide for limiting the number of interruptions while a user is interacting with a computer system.

It is an advantage of some embodiments of the invention that the execution of an interruption routine may be controlled in dependence of whether input data in response to a user interacting with the computer system is detected. Accordingly, the execution of the interruption routine may be controlled based on whether the user is actively interacting with the computer system. In some embodiments, the number of interruptions may thus be limited at least while the user is actively interacting with the computer system.

BRIEF DESCRIPTION OF THE DRAWINGS

Further features and advantages of embodiments of the invention will appear from the following detailed description of the invention, reference being made to the accompanying drawings, in which.

DETAILED DESCRIPTION OF EMBODIMENTS

Specific illustrative embodiments of the invention will now be described with reference to the accompanying drawings. This invention may, however, be embodied in many different forms and should not be construed as limited to the embodiments set forth herein. Rather, the disclosed embodiments are provided so that this specification will be thorough and complete, and will fully convey the scope of the invention to those skilled in the art. The terminology used in the detailed description of the particular embodiments illustrated in the accompanying drawings is not intended to be limiting of the invention. Furthermore, in the drawings like numbers refer to like elements.

Figure 1:
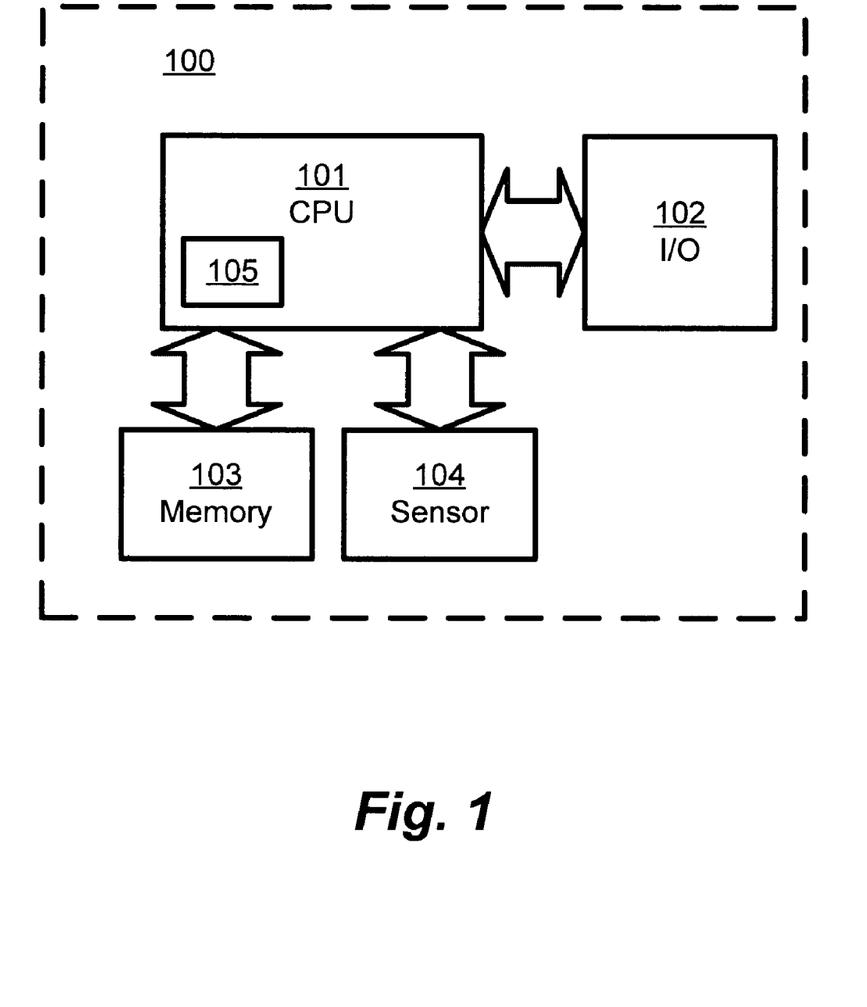
FIG. 1 is a block diagram of a computer system for controlling the execution of an interruption routine according to an embodiment of the invention.

FIG. 1 illustrates an embodiment of a computer system 100 for controlling the execution of an interruption routine according to an embodiment of the invention. The computer system 100 is an electronic device capable of interpreting and executing programmed commands for input, output, computation, and logic operations. The electronic device may, for instance, be a portable radio communication equipment, a mobile radio terminal, a mobile telephone, a communicator, an electronic organizer, a smartphone, a computer or a personal computer. The computer system 100 may comprise, but is not limited to, a central processing unit 101, a user interface 102 including an input device and an output device, an internal storage device 103, and a sensor 104 all of which may be interconnected. The central processing unit 101 may further comprise a monitoring unit 105. The monitoring unit 105 may be a hardware component or a software component performing monitoring functions.

The computer system 100 is configured to perform application multitasking. As used herein, the term application multitasking is referred to the ability of the central processing unit 101 to execute more than one application substantially at the same time or in parallel. The central processing unit 101 may also be adapted to switch from one application to another application so quickly that it gives the appearance of executing all applications at the same time. In this connection, it should also be noted that the computer system 100 may be adapted to execute so-called foreground applications as well as so-called background applications. A foreground application is an application that accepts input from the input device of the user interface 102. On the other hand, a background application cannot, in general, accept input from a user via the user interface 102. Nevertheless, the background application may be configured to access data stored in, e.g., the internal storage device. Background applications generally have a lower priority than foreground applications so that they do not interfere with, e.g., active applications. It should be appreciated that the term application multitasking as used herein may include, but is not limited to, co-operative multitasking and preemptive multitasking.

Figure 2:
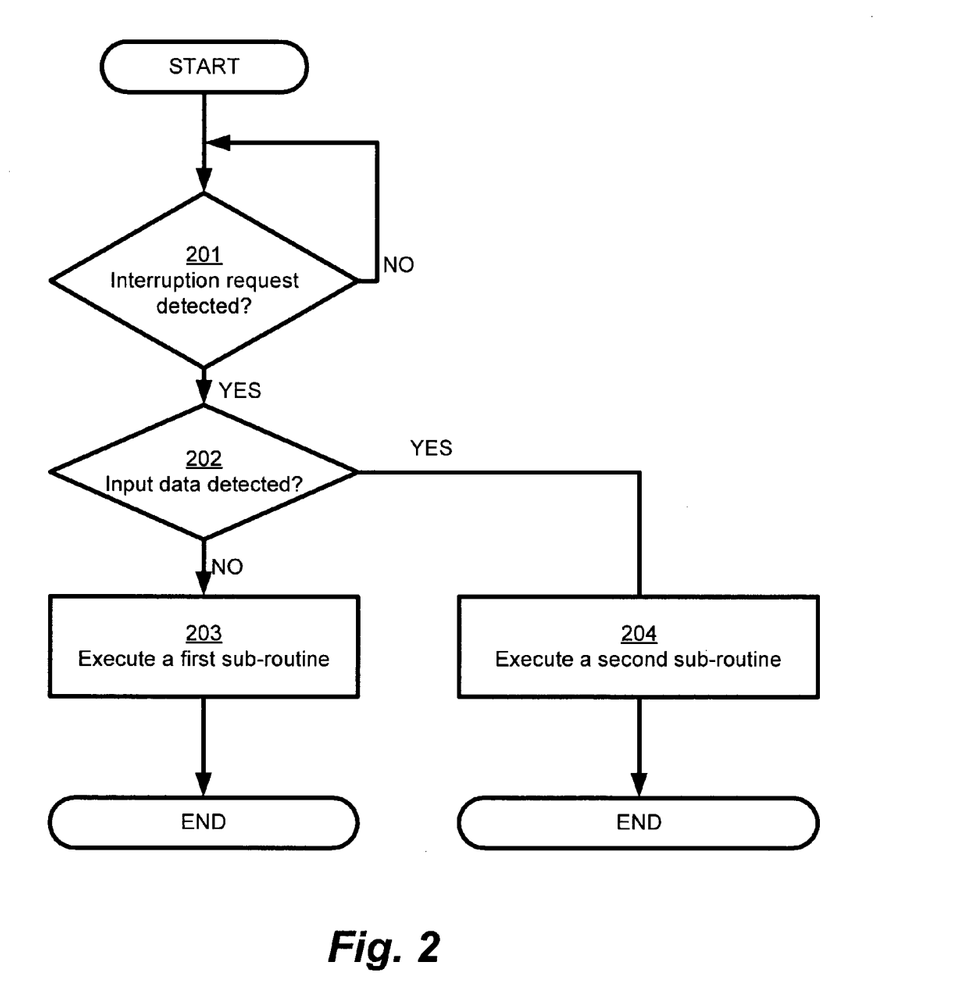
FIG. 2 is a flowchart of an embodiment of a method for controlling the execution of an interruption routine.

FIG. 2 illustrates an embodiment of a method performed by the computer system 100 for controlling the execution of an interruption routine for interrupting an active application. The active application is an application, which the user has most recently interacted with via the user interface 102. Thus, an active application may be an application with which the user is currently interacting via the user interface 102. The user may interact with an application via the user interface 102 in various ways, e.g., by pressing keys on a keypad, clicking with a mouse, navigating with a navigator key, etc. Various ways of interacting with an application in a computer system 100 via a user interface 102 are known in the art, and will not be further explained herein.

In step 201, it is monitored whether any application of a plurality of other applications is requesting interruption of the active application. Accordingly, it is detected in step 201 whether any application of the plurality of other applications is requesting interruption of the active application. For example, step 201 may be performed by means of the monitoring unit 105 of the central processing unit 101. The monitoring unit 105 may, e.g., be a program controller. Any application that can trigger an interruption routine for interrupting the active application may be detected in step 201. According to embodiments of the invention, this may be accomplished independently of which application requests the interruption. However, not all applications of the plurality of other applications request interruption of the active application. For example, some applications may be run as a background application and, thus, need not request any interruption of the active application.

If it is detected in step 201 that any application requests the active application to be interrupted, the method proceeds to step 202. Otherwise, the method may return to step 201. Typically, as soon as the occurrence of any interruption request for interrupting the active application has been detected in step 201, an interruption request signal is generated and transmitted from the monitoring unit 105 to the central processing unit 101. In response to the interruption request signal, the central processing unit 101 determines the start address of the interruption routine, which is supposed to run for executing the interruption of the active application in the central processing unit 101. However, prior to the execution of the interruption routine for interrupting the active application, it is detected in step 202 whether input data is generated in response to a user interacting with the computer system 100. In step 202, it is possible to detect whether the user is interacting with the computer system 100. In accordance with embodiments of the invention, the central processing unit 101 is adapted to control the execution of the interruption routine in dependence of whether input data has been generated in response to a user interacting with the computer system 100. In some embodiments of the invention it is possible to execute the interruption routine only when it has been determined that the user is not interacting with the computer system 100, that is, when input data generated in response to the user has not been detected in step 202.

With reference to the embodiment shown in FIG. 2, the execution of any interruption routine may be controlled in dependence of whether it is detected that input data has been generated in response to a user interacting with the computer system 100. The detection in step 202 can be performed in various ways. For example, the sensor 104 may be adapted to detect the power consumption of the computer system 100. Information regarding the detected power consumption may, e.g., be transmitted from the sensor 104 to the central processing unit 101 by means of an electrical carrier signal. The information regarding the detected power consumption is used by the central processing unit 101 as input data in response to a user interacting with the computer system 100. When the user is actively interacting with the computer system 100 more power will be consumed by the computer system 100, compared to the situation when the user is not interacting with the computer system 100. Thus, if the power consumption is above a certain predetermined threshold value it can be determined that the user is interacting with the computer system 100. On the other hand, when it is detected that the power consumption is equal to or below the certain predetermined threshold value, it can be determined that the user is not interacting with the computer system 100.

Additionally, or alternatively, the detection in step 202 may be based on key presses or other types of interactions with the input device of the user interface 102. For example, input data in response to a user interacting with the input device of the user interface 102 may be transmitted from the input device of the user interface 102 to the central processing unit 101. Thus, the central processing unit 101 may detect input data generated in response to a user interacting with the computer system 100. Furthermore, the central processing unit 101 may be adapted to calculate the time period elapsed from the last detected input data generated in response to the user interacting with the computer system 100. If the user is actively interacting with the computer system 100, the time period elapsed since the last detected input data will be short compared to the situation when the user is not interacting with the computer system 100. Consequently, if the elapsed time period is below a certain predetermined threshold value it is determined that the user is interacting the computer system 100. On the other hand, if the elapsed time period is equal to or above the certain predetermined threshold value it is determined that the user is not interacting with the computer system 100.

Figure 3A:
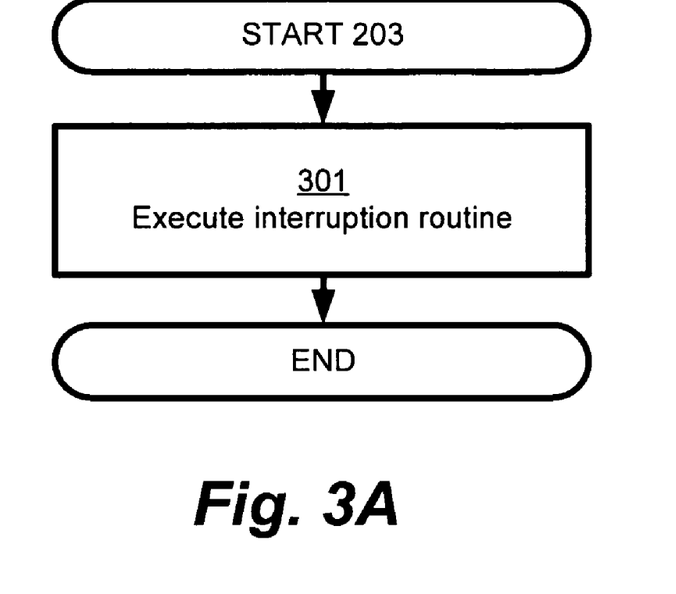
FIG. 3A is a flowchart of an embodiment of a first sub-routine of the interruption routine.
Figure 3B:
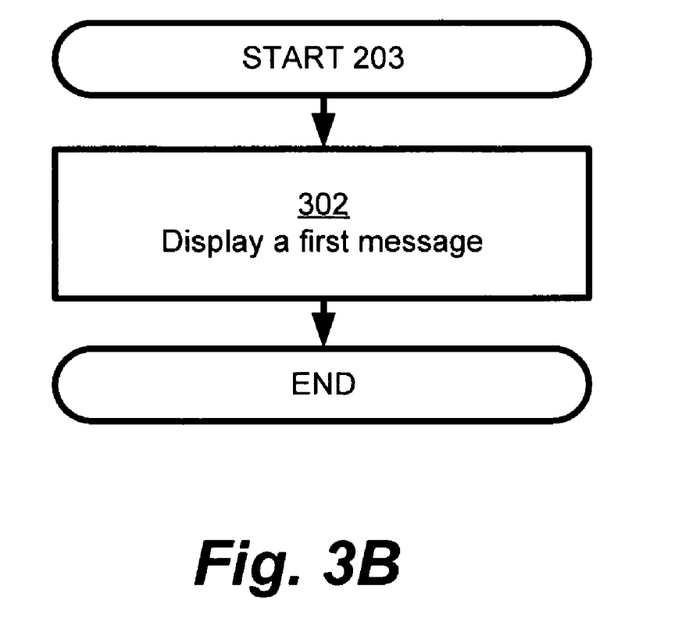
FIG. 3B is a flowchart of an embodiment of a first sub-routine of the interruption routine.

When input data in response to a user interacting with the computer system 100 has not been detected in step 202, e.g., when the user is not interacting with the computer system, the method proceeds to step 203. In step 203, a first sub-routine of the interruption routine is executed. In an embodiment, which is shown in FIG. 3A, the first sub-routine may simply comprise initiating the execution of the interruption routine for interrupting the active application in step 301. However, since step 301 is performed when the user is not interacting with the computer system 100, the execution of the interruption routine will not interrupt any user's current interaction with the computer system 100. Thus, executing the interruption routine in step 301 is of little or no problem to the user. In an embodiment, which is shown in FIG. 3B, the execution of the first sub-routine may comprise displaying a first message on a display (not shown) of the computer system 100. This is accomplished in step 302. The first message may, e.g., be dialog box. That is, the first message may be a message being displayed at the display of the computer system on top of the active application. However, displaying a dialog box on top of the active application on the display would be of little or no problem to the user when the user is not interacting with the computer system 100, since such dialog box would not interrupt the user in the user's current interaction with the computer system 100.

However, when input data generated in response to a user interacting with the computer system 100 is detected in step 202, the method proceeds to step 204. Accordingly, when the user is actively interacting with the computer system 100, the method proceeds to step 204. In step 204, the execution of any interruption routine may be controlled such that the interruption routine will not interrupt a user's current interaction with the computer system 100. As a consequence, when the user is, e.g., actively interacting with a certain active application via the user interface 102, the user will not be interrupted by a second application of a plurality of other applications, irrespective of whether the second is requesting interruption of the active application or not.

Figure 4A:
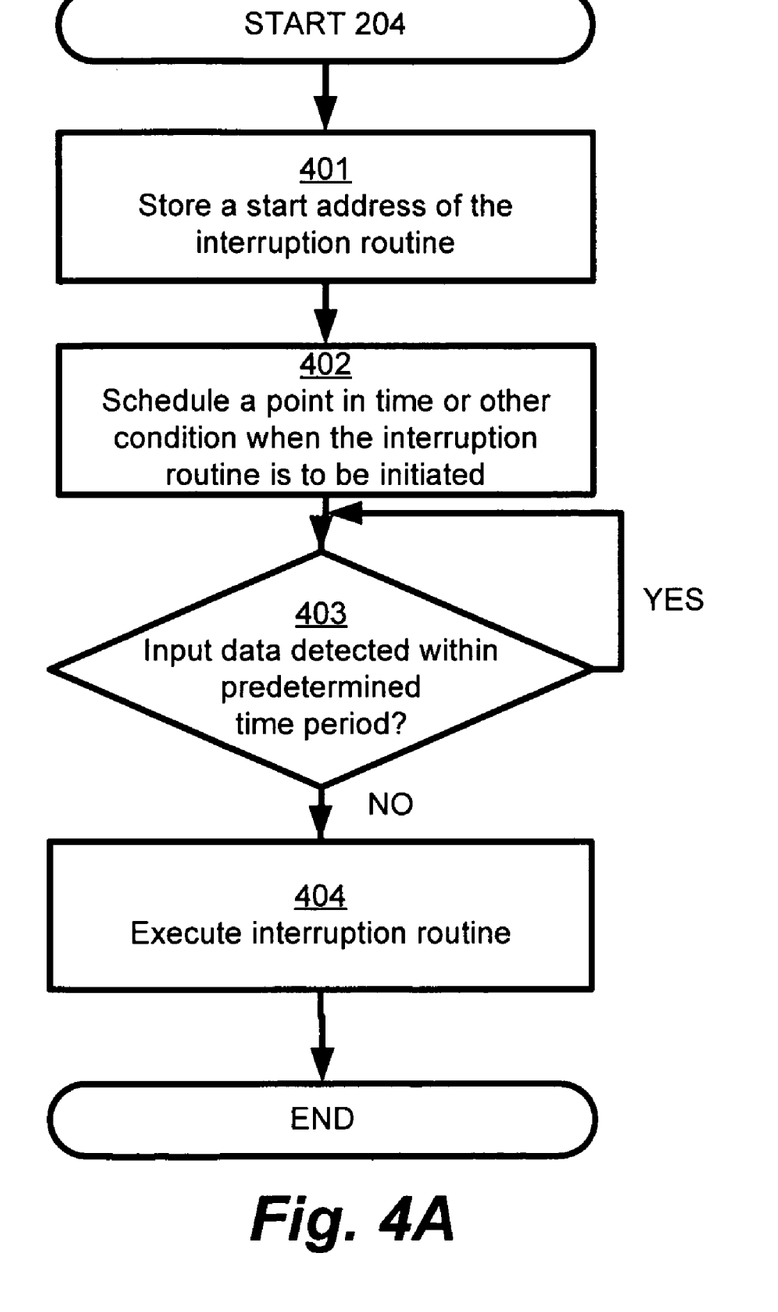
FIG. 4A is a flowchart of an embodiment of a second sub-routine of the interruption routine.

In an embodiment, which is shown in FIG. 4A, the execution of the second sub-routine comprises a step 401 of storing the start address of the interruption routine, which is supposed to run for executing the interruption of the active application in the central processing unit 101. The start address may, e.g., be stored in the internal storage device 103. Furthermore, in step 402 a point in time or other condition when the stored start address is to be initiated may be scheduled. For example, the scheduled point in time or the other condition may be chosen to be a point in time or other condition when it has been detected that the user is no longer interacting with the computer system 100. Accordingly, it may be determined that the point in time or the other condition when the execution of the interruption routine is to be initiated is when input data generated in response to the user interacting with the computer system 100 has not been detected for a predetermined time period. In step 403, it is determined whether any input data has been detected within the predetermined time period. The detection in step 403 whether the user is interacting with the computer system 100 may, e.g., be performed in a similar manner as in step 202 of FIG. 2. If input data generated in response to the user interacting with the computer system 100 has not been detected within the predetermined time period, it is determined that the user is no longer interacting with the computer system 100. Thus, the method may proceed to step 404, where the execution of the interruption routine may be initiated. Accordingly, according to some embodiments of the invention the interruption routine may be scheduled to be executed as soon as it has been detected that the user is no longer interacting with the computer system 100. As a consequence, it is possible to postpone the execution of any interruption routine until a point in time where the execution of the interruption routine will no longer interrupt a user's current interaction with the computer system 100.

Figure 4B:
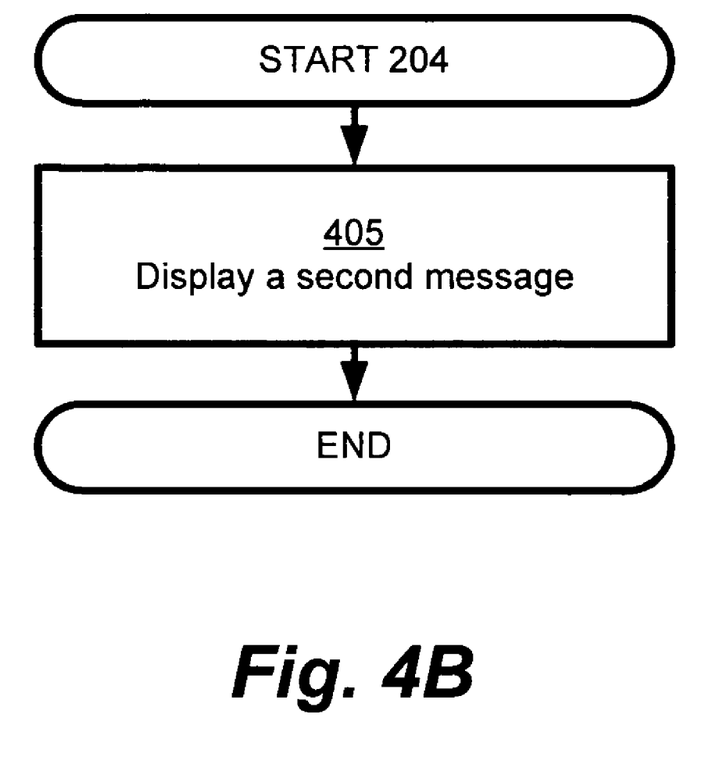
FIG. 4B is a flowchart of an embodiment of a second sub-routine of the interruption routine.

In an embodiment, shown in FIG. 4B, the execution of the second sub-routine may comprise displaying a second message in step 405. The second message is displayed on a display (not shown) of the computer system. The second message is configured not to interrupt a user's current interaction with the computer system 100, but rather only make the user informed about the interruption. For example, the second message may be configured not to be displayed on top of an active application. Rather, the second message may be configured to be displayed in an activity field or the like of the display. Moreover, the second message may, e.g., be a message with a relatively small size, e.g., an icon. Moreover, the second message may be configured to present information to the user, but not request any input. Thus, the second message may be displayed on the display of the computer system without interrupting the user when the user is actively interacting with the computer system 100.

At least one embodiment of the invention may enable a limitation of the number of interruptions while the user is interacting with the computer system.

An advantage of at least some embodiments of the invention is that user activity and/or inactivity is considered when deciding whether an interruption routine for interrupting an active application should be executed. With at least some embodiments of the invention, a user who is actively interacting with a current application in the computer system, e.g., composing a document in a word processing application, will not be interrupted by any other application while he is actively interacting with the current application. Moreover, in some embodiments of the invention, the active application may not be interrupted by any other application while the user is actively interacting with the computer system, irrespective of which application requests the interruption of the active application.

Although the embodiments of the present invention described with reference to the drawings comprise a computer system 100 and processes performed in the computer system 100, the invention also extends to a computer program product, which enables implementation of the method and functions described herein. The invention may be carried out when the computer program product is loaded and executed in a system having computer capabilities. Computer program, software program, program product, or software, in the present context mean any expression, in any programming language, code or notation, of a set of instructions intended to cause a system having a processing capability to perform a particular function directly or after conversion to another language, code or notation.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" to another element, it can be directly connected to the other element or intervening elements may be present. Furthermore, "connected" as used herein may include wirelessly connected. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The invention has been described above with reference to specific embodiments. However, other embodiments than the above described are equally possible within the scope of the invention. For example, only two examples of how to detect input data generated in response to a user interacting with the computer system 100 have been described. However, other possible ways of detecting user activity and/or user inactivity are also possible within the scope of the present invention. Different method steps than those described above, performing the method by hardware or software or a combination of hardware and software, may be provided within the scope of the invention. It should be appreciated that the different features and steps of the invention may be combined in other combinations than those described. The functions/acts noted in the flowcharts may occur out of the order noted in the operational illustrations. For example, two blocks shown in succession may in fact be executed substantially concurrently or the blocks may sometimes be executed in the reverse order, depending upon the functionality/acts involved. With reference to FIG. 2, the block 202 could, e.g., be executed prior to the block 201 in some embodiments. It should be noted that the scope of the invention is only limited by the appended patent claims.

What is claimed is:

1. A method performed by a computer system for controlling the execution of an interruption routine for interrupting an active application, comprising:
    detecting if a first application of a plurality of other applications is requesting interruption of the active application;
    determining, if the first application is requesting interruption of the active application, whether input data has been detected in response to a user interacting with the computer system;
    executing a first sub-routine of the interruption routine when the input data has not been detected; and
    executing a second sub-routine of the interruption routine when the input data has been detected, the executing a second sub-routine comprising:
        storing a start address of the interruption routine in an internal storage device of the computer system,
        determining when input data generated in response to the user interacting with the computer system has not been detected for a predetermined time, and
        initiating the execution of the interruption routine when the input data has not been detected for the predetermined time.

2. The method of claim 1, wherein the executing the first sub-routine comprises initiating the execution of the interruption routine.

3. The method of claim 1, wherein the executing the first sub-routine comprises displaying a first message on a display of the computer system, and the executing the second sub-routine comprises displaying a second message on the display of the computer system.

4. A method performed by a computer system for controlling the execution of an interruption routine for interrupting an active application, comprising:
    detecting if a first application of a plurality of other applications is requesting interruption of the active application;
    determining, if the first application is requesting interruption of the active application, whether input data has been detected in response to a user interacting with the computer system, wherein the determining further comprises calculating the time period elapsed from the last detected input data;
    executing a first sub-routine of the interruption routine when the input data has not been detected, wherein executing the first sub-routine is performed when the calculated time period is equal to or above a predetermined threshold value; and
    executing a second sub-routine of the interruption routine when the input data has been detected, and wherein the executing the second sub-routine is performed when the calculated time period is below the predetermined threshold value.

5. A computer program product stored on a computer-readable memory device, the computer program product comprising program instructions for execution by a computer system and causing the computer system to perform a method to control the execution of an interruption routine for interrupting an active application when said program instructions are executed by the computer system, the method comprising:
    detecting if any application of a plurality of other applications is requesting interruption of the active application;
    determining, if any application of the plurality of other applications is requesting interruption of the active application, whether input data has been detected in response to a user interacting with the computer system;
    executing a first sub-routine of the interruption routine when the input data has not been detected; and
    executing a second sub-routine of the interruption routine when the input data has been detected, the executing a second sub-routine comprising:
        determining when input data generated in response to the user interacting with the computer system has not been detected for a predetermined time, and
        initiating the execution of the interruption routine when the input data has not been detected for the predetermined time.

6. The computer program product according to claim 5, wherein the computer-readable memory device comprises a read-only memory.

7. A computer system for controlling the execution of an interruption routine for interrupting an active application, comprising:
    a monitoring unit configured to detect if a first application of a plurality of other applications is requesting interruption of the active application; and
    a processing unit coupled to the monitoring unit and configured to:
        detect input data generated in response to a user interacting with the computer system, and
        execute a first sub-routine of the interruption routine when the input data has not been detected and a second sub-routine of the interruption routine when the input data has been detected, the executing a second sub-routine comprising:
        determining when input data generated in response to the user interacting with the computer system has not been detected for a predetermined time, and
        initiating the execution of the interruption routine after the input data has not been detected for the predetermined time.

8. The computer system of claim 7, wherein the processing unit is further configured to execute the first sub-routine by initiating the execution of the interruption routine.

9. The computer system of claim 7, wherein the processing unit is further configured to execute the second sub-routine by storing a start address of the interruption routine in an internal storage device of the computer system, scheduling a point in time when the interruption routine is to be executed, and initiating the execution of the interruption routine at the scheduled point in time.

10. The computer system of claim 7, wherein the processing unit is further configured to execute the first sub-routine by displaying a first message on a display of the computer system, and wherein the processing unit is further configured to execute the second sub-routine by displaying a second message on the display of the computer system.

11. The computer system of claim 7, wherein the computer system is an electronic device comprising one of: a portable radio communication device, a mobile radio terminal, a mobile telephone, a communicator, an electronic organizer, a smartphone, a computer, and a personal computer.

12. A computer system for controlling the execution of an interruption routine for interrupting an active application, comprising:

a monitoring unit configured to detect if an application of a plurality of other applications is requesting interruption of the active application; and a processing unit coupled to the monitoring unit and configured to:
- detect input data generated in response to a user interacting with the computer system,
- calculate the time period elapsed from the last detected input data,
- execute the first sub-routine of the interruption routine when the calculated time period is equal to or above a predetermined threshold value, and
- execute the second sub-routine of the interruption routine when the calculated time period is below the predetermined threshold value.

* * * * *